Patented Mar. 18, 1952

2,589,871

UNITED STATES PATENT OFFICE 2,589,871

PURIFICATION OF VINYL AROMATIC COMPOUNDS

Benjamin B. Schaeffer, Niagara Falls, N. Y., assignor to Mathieson Chemical Corporation No Drawing. Application September 25, 1948, Serial No. 51,313

6 Claims. (Cl. 260—650)

The present invention relates to the purification of vinyl aromatic compounds and, more particularly, relates to the removal therefrom of acetylenic impurities, for instance, phenyl acetylene with which the vinyl aromatic compounds are frequently contaminated.

Acetylenic compounds are particularly objectionable in monomeric vinyl aromatics to be polymerized because of their deleterious effect on the physical properties of the polymers and copolymers prepared from such monomers. Phenyl acetylene itself acts as an inhibitor of polymerization with respect to styrene and it is difficult to remove therefrom. While the presence of inhibitors in polymerizable monomers may be desirable under some circumstances, it is advantageous that such inhibitors be readily removable therefrom when it is desired to carry out a polymerization. The acetylenic compounds are relatively difficult to remove from the corresponding vinyl aromatics, and for this reason, phenyl acetylene is an undesirable inhibitor in styrene. In the case of mixed isomeric nuclear dichlorostyrenes, the related dichlorophenylacetylenes do not act as inhibitors of polymerization but are copolymerizable with the dichlorostyrenes. Because of their deleterious effect on the physical properties of the polymer, it is particularly important to remove dichlorophenylacetylenes from the dichlorostyrenes.

The invention provides an improved method whereby the proportion of acetylenic impurities present in vinyl aromatic compounds may readily and economically be either substantially reduced, or completely eliminated, by selectively reacting the acetylenic compound present therein with a thiocyanic compound of the type hereinafter noted and separating the reaction product from the vinyl aromatic compound by use of a selective solvent, by selective adsorption or other known means, or by a suitable combination of such means.

The thiocyanic compounds suitable for my purpose are thiocyanic acid, thiocyanogen or reagents which react to produce such thiocyanic compounds, for instance, sodium thiocyanate and acetic acid to produce thiocyanic acid or sodium thiocyanate and acetic acid with elemental bromine added if the thiocyanogen is desired.

I have found both thiocyanic acid, having the formula HSCN, and thiocyanogen, having the formula $(SCN)_2$, to be effective for my purpose and it appears that they are the active agents in my process. They may be prepared by any known means and added to the contaminated vinyl aromatic, as such. However, it is convenient to add the thiocyanic compound as a solution of sodium thiocyanate in acetic acid as just noted and this procedure has been found to be equally effective.

In place of the sodium thiocyanate, I may use any other alkali metal thiocyanate or ammonium thiocyanate. Potassium thiocyanate may be used with particular advantages. Reference in the appended claims to alkali metal thiocyanates will be understood to include ammonium thiocyanate.

Acetic acid is an especially useful solvent for the thiocyanate, but other low molecular weight fatty acids, i. e. normally liquid fatty acids, for instance, propionic acid may be used for the purpose. Where thiocyanogen is used I prefer acetic acid to formic acid.

The process of my present invention is applicable to vinyl aromatics generally including, for example, styrene, p-methylstyrene, alpha-methyl-p-methylstyrene and higher homologues thereof, the halostyrenes including monohalostyrenes, e. g.: o-fluorostyrene, p-chlorostyrene, all the isomeric nuclear dichlorostyrenes and mixtures thereof, the trichlorostyrenes and pentachlorostyrene, m-trifluoromethylstyrene, vinyl naphthalene, divinylbenzene, vinylthiophene and vinylcarbazole.

The proportion of the thiocyanic reagent to be used in the purification of the vinyl aromatic should be at least the amount theoretically necessary to react with the acetylenic contaminant to be removed. It is particularly advantageous however to use a substantial excess over the theoretically required amount, for example, two or three times the theoretical amount, in which case the purification proceeds satisfactorily even at room temperature to remove the contaminant substantially completely.

It will be understood that the theoretical amount of thiocyanic acid required to react with the acetylenic compound will be one mol of thiocyanic acid per mol of the acetylenic compound, assuming that the latter contains a single acetylenic group. Where more than one acetylenic group is present in the acetylenic compound, a proportionally greater amount of thiocyanic acid will be required. The molar proportion of thiocyanogen will be one-half the requirement of thiocyanic acid.

The reaction with the thiocyanic compound usually proceeds satisfactorily at room temperatures say 20–30° C., but elevated temperatures up to about 60° C. may be used.

For best results, it is essential that the reaction product be removed from the vinyl aromatic compound, for while the thiocyanic agent apparently reacts with the acetylenic compound to convert it to some other material which interferes less with the polymerization and with the physical properties of the polymer than do the acetylenic compounds, the maximum advantages of the invention are not attained without the substantial removal of the reaction products.

The purified vinyl aromatic may, with particular advantage, be separated from the remainder of the reaction mixture by adding water to the mixture in an amount sufficient to effect the stratification of an aqueous phase containing excess reagent, reactants or products from the preparation of the reagent and solvent, e. g. acetic acid, when used, and a vinyl aromatic phase which includes thiocyanated reaction products, separating the two phases as by decantation or other suitable means, washing the vinyl aromatic phase with additional water to remove residual amounts of the reagent and its by-products, e. g. sodium acetate or bromide, drying the washed vinyl aromatic phase by means of a suitable drying agent, for instance, potassium carbonate or calcium chloride and finally passing the dried vinyl aromatic phase in contact with a selective adsorbent capable of selectively adsorbing the thiocyanated reaction products. Activated alumina has been found to be an especially effective adsorbent agent for this purpose. Activated magnesia is also suitable as the selective adsorbent. Other effective selective adsorbents may be used without departing from the spirit of my invention.

Where the purified vinyl aromatic is intended for a purpose for which the presence of the thiocyanated reaction products are not objectionable, or in the reaction products need not be completely removed, the final treatment of the vinyl aromatic with the selective adsorbent may be omitted.

My process will be further illustrated by the following specific examples of its application to the purification of nuclear dichlorostyrene. It will be understood, however, that the scope of the invention is not so restricted.

*Example I*

A sample of 50 milliliters of mixed nuclear dichlorostyrene monomers, shown by infra-red analysis to contain 0.26% by weight of dichlorophenylacetylene, was stirred for 30 minutes at a temperature of 25° C. with a solution of 6.2 grams of ammonium thiocyanate in 35 milliliters of glacial acetic acid. 300 milliliters of water was added to the resultant mixture thereby effecting the stratification of an oil phase and a water phase. The oil phase was washed with 300 milliliters of additional water, dried with calcium chloride and passed through a column of activated alumina. The resultant nuclear dichlorostyrene mixture was found by infra-red analysis to contain only 0.03% by weight of dichlorophenylacetylene.

*Example II*

A sample of 80 milliliters of mixed dichlorostyrene monomers, shown by infra-red analysis to contain 0.34% by weight of dichlorophenylacetylene, was mixed at 20° C. with a solution of 0.32 gram (0.004 mol, which is the theoretical amount corresponding to the dichlorophenylacetylene present) of sodium thiocyanate dissolved in 80 milliliters of glacial acetic acid. To this mixture 0.32 gram (0.002 mol) of elemental bromine dissolved in 10 milliliters of glacial acetic acid was added slowly with stirring for 30 minutes. To the resultant mixture there was added 300 milliliters of water to effect the stratification of an oil phase and a water phase. The oil phase was separated and washed twice with 300 milliliter portions of additional water, dried with potassium carbonate and passed through a column of activated alumina. The resultant purified dichlorostyrenes was shown by infra-red analysis to contain only 0.09% by weight of dichlorophenylacetylene.

In the preceding Example I, the active reagent is the thiocyanic acid resulting from the reaction of the ammonium thiocyanate with the glacial acetic acid. In Example II, thiocyanogen was formed due to the presence of the elemental bromine and was the active reagent in that operation.

*Example III*

The procedure of the foregoing Example II was repeated substantially as described except that the temperature of the reacting mixture was maintained at 30° C. The resultant mixed nuclear dichlorostyrene monomers were found to be completely free from dichlorophenylacetylene.

*Example IV*

The procedure of Example II was repeated substantially as described, except that twice the amount of sodium thiocyanate was used. The reaction temperature was 20° C. as in Example II. The resultant mixed nuclear dichlorostyrene monomers were found by infra-red analysis to be completely free from dichlorophenylacetylene.

*Example V*

A 60 milliliter sample of monomeric mixed nuclear dichlorostyrenes, shown by infra-red analysis to contain 0.26% by weight of dichlorophenylacetylene, was agitated for 30 minutes with a solution of 3.8 grams of ammonium thiocyanate in 40 milliliters of glacial acetic acid. The oil phase was separated by the addition of 300 milliliters of water, washed twice with 300 milliliter portions of water, dried with calcium chloride and passed through a column of activated alumina. The resultant mixed nuclear dichlorostyrenes were found by infra-red analysis to contain only 0.01% by weight of dichlorophenylacetylene.

I claim:

1. A method of treating vinyl aromatic compounds which are free from acetylenic groups but which are contaminated by the presence of acetylenic impurities to remove the latter therefrom which comprises reacting the acetylenic compound in the presence of the vinyl aromatic with a thiocyanic compound of the class consisting of thiocyanic acid and thiocyanogen, adding water to the resultant mixture in an amount sufficient to effect stratification of an aqueous phase and a vinyl aromatic phase containing thiocyanated reaction products, separating the latter phase from the aqueous phase, drying the washed vinyl aromatic phase and passing the dried vinyl aromatic phase in contact with an adsorbent selected from the group consisting of activated alumina and activated magnesia.

2. A method of treating dichlorostyrenes contaminated by the presence of acetylenic impurities to remove the latter therefrom which comprises reacting the acetylenic compound in the presence of the dichlorostyrene with a thiocyanic compound of the class consisting of thiocyanic acid and thiocyanogen, adding water to the resultant mixture in an amount sufficient to effect stratification of an aqueous phase and a dichlorostyrene phase containing thiocyanated reaction products, separating the latter phase from the aqueous phase, drying the washed dichlorostyrene phase and passing the dried dichlorostyrene phase in contact with an adsorbent selected from the group consisting of activated alumina and activated magnesia.

3. The process of claim 1 in which the acetylenic compound is reacted with thiocyanic acid generated in situ by adding to the contaminated vinyl aromatic compound an alkali metal thiocyanate and a low molecular weight, normally liquid, fatty acid.

4. The process of claim 1 in which the acetylenic compound is reacted with thiocyanogen generated in situ by adding to the contaminated vinyl aromatic compound an alkali metal thiocyanate, acetic acid, and elemental bromine.

5. The process of claim 1 in which said adsorbent is activated alumina.

6. The process of claim 2 in which said adsorbent is activated alumina.

BENJAMIN B. SCHAEFFER.

REFERENCES CITED

The following references are of record in the file of this patent:

UNITED STATES PATENTS

| Number | Name | Date |
| --- | --- | --- |
| 1,790,097 | Kaufmann | Jan. 27, 1931 |

FOREIGN PATENTS

| Number | Country | Date |
| --- | --- | --- |
| 525,136 | Great Britain | Aug. 22, 1940 |

OTHER REFERENCES

Bruson et al., "Jour. Am. Chem. Soc.," vol. 50, pages 1735–7 (1928).

Dermer et al., "Jour. Am. Chem. Soc.," vol. 61, page 750 (1939).

Degering, "An Outline of Organic Nitrogen Compounds," pages 544–5, 558 (1945).

Migrdichian, "The Chemistry of Organic Cyanogen Compounds," page 391 (1947).